United States Patent [19]

Cobbledick et al.

[11] 3,876,571

[45] Apr. 8, 1975

[54] FLEXIBLE POLYURETHANE FOAMS WHICH ARE FLAME RETARDANT

[75] Inventors: David S. Cobbledick, Kent; Arthur J. Norman, Tallmadge, both of Ohio

[73] Assignee: The General Tire & Rubber Company, Akron, Ohio

[22] Filed: Feb. 22, 1973

[21] Appl. No.: 333,251

Related U.S. Application Data

[63] Continuation-in-part of Ser. No. 253,368, May 15, 1972, abandoned.

[52] U.S. Cl.. 260/2.5 AJ; 260/2.5 BE; 260/2.5 AK; 260/2.5 FP; 260/18 TN; 260/37 N
[51] Int. Cl............................................. C08g 22/46
[58] Field of Search .... 260/2.5 AJ, 2.5 BE, 2.5 AK, 260/2.5 FP

[56] References Cited

UNITED STATES PATENTS

| | | | |
|---|---|---|---|
| 3,574,149 | 4/1971 | Harrington | 260/2.5 AJ |
| 3,635,821 | 1/1972 | Treadwell | 260/2.5 AJ |
| 3,697,456 | 10/1972 | Pitts | 260/2.5 AK |

Primary Examiner—Melvyn I. Marquis

[57] ABSTRACT

In low density, flexible and semiflexible polyetherurethane foams containing chlorine-containing polymers such as polyvinyl chloride, zinc oxide and antimony oxide, part of the chlorine-containing polymer can be replaced with a chlorinated paraffin provided a proportionate reduction is made in the amount of the zinc oxide employed. Such foams are still flame retardant.

6 Claims, No Drawings

3,876,571

FLEXIBLE POLYURETHANE FOAMS WHICH ARE FLAME RETARDANT

This application is a continuation-in-part of prior copending U.S. Pat. application Ser. No. 253,368, filed May 15, 1972 and entitled "Flexible Polyurethane Foams Which Are Flame Retardant," now abandoned.

BACKGROUND OF THE INVENTION

Flexible and semiflexible low density polyurethane foams have found widespread utility in the fields of insulation, structural reinforcement, cushioning and electrical encapsulation. Low density flame retardant foams containing polyvinyl chloride, antimony trioxide and zinc oxide (French Process) are disclosed by U.S. Pat. No. 3,574,149. The use of a combination of antimony oxide and finely divided vinyl halide resin is specifically shown in U.S. Pat. No. 3,075,928. A flame retardant composition for urethane foams comprising an inert filler (staurolite, perlite, silicon dioxide sand, a fused glass composition of antimony trioxide or a combination of antimony trioxide and a borate, aluminum silicate, antimony pentoxide, zirdon, barytes or colemanite), a halogen source (chlorinated paraffin, perchloropentacyclodecane, chlorinated polyethylene, polyvinyl chloride or bromophenols), and a phosphorus-containing compound (hydrated calcium phosphate, ammonium phosphate, triphenyl phosphine oxide, tricresyl phosphate and halogenated phosphates) is shown in U.S. Pat. No. 3,635,821.

It is the primary object of this invention to provide flexible and semiflexible, low density polyetherurethane foams which have the property of flame-resistance even to the point of being self-extinguishing. It is a further object to provide a method for making such foams by the use of a simple but novel combination of additives.

These and other object and advantages of the present invention will become more apparent to those skilled in the art from the following detailed description and examples.

SUMMARY OF THE INVENTION

According to the present invention it has now been discovered that flexible and semiflexible polyetherurethane foams are rendered not only flame-resistant but also self-extinguishing by incorporating into the foam composition, prior to the blowing thereof into a foam, finely divided zinc oxide, antimony trioxide, a chlorine-containing solid polymer and a chlorinated paraffin wherein the chlorinated paraffin is used to replace part of the chlorine-containing polymer and wherein the amount of the zinc oxide is reduced in proportion to the reduction in the chlorine-containing polymer.

DESCRIPTION OF THE PREFERRED EMBODIMENTS

The polyurethane foaming compositin or formulation must contain per 100 parts by weight of the organic polyol from about 0.1 to 10 parts, preferably about 0.2 to 5 parts, of zinc oxide and from about 0.5 to 15 parts, preferably about 1 to 10 parts, of antimony trioxide ($Sb_2O_3$).

The chlorine-containing solid polymers employed herein include polymers, usually resinous in character, of vinyl chloride and vinylidene chloride and mixtures of these monomers as well as copolymers of a predominating molar amount of one or more of these monomers and a minor amount of vinyl acetate, acrylonitrile, methacrylonitrile, dimethyl or diethyl maleate or fumarate, methyl acrylate, methyl methacrylate, ethyl ethacrylate, vinyl stearate and the like and mixtures thereof. Still other halogen-containing resins can be used such as hydrolyzed or partially hydrolyzed copolymers of a major amount of the vinyl chloride and a minor amount of vinyl acetate. Moreover, other resinous polymers can be used such as chlorinated rubber, chlorinated polyethylene, chlorinated polyvinyl chloride and the like. Mixtures of the chlorine-containing polymeric resins can be used.

These chlorine-containing polymeric resins should be finely divided (powders having average particle sizes of from about 0.00001 to 1 mm.) and have an intrinsic viscosity of from about 0.25 to 2.5, preferably from about 0.5 to 1.5. The chlorine-containing resinous polymers are generally used in an amount of from about 1 to 50 parts by weight per 100 parts by weight of the polyol to obtain the desired load bearing characteristics, preferably from about 2 to 25 parts by weight. The larger particle size resins can be used in larger amounts within the given ranges. However, the finer or smaller particle size resins should be used in smaller amounts within the ranges shown to avoid the formation of viscous, difficult to pump or stir, fluids, gels or pastes. The chlorine-containing polymers can be made by bulk, solvent, emulsion or suspension polymerization process. A preferred polymer to use is polyvinyl chloride which has been prepared by emulsion polymerization.

Part of the chlorine-containing polymeric resin used in the foam formulation is replaced with a chlorinated paraffin or with mixtures of chlorinated paraffins. These materials are made by the chlorination of liquid paraffin fractions and/or paraffin waxes. The chlorinated paraffins have average molecular weights of from about 250 to 1400 and chlorine contents of from about 40 to 70 percent by weight. They can be liquids or solids; preferably the liquid (at room temperature, 20 to 30°C.) chlorinated paraffins are employed in the practice of the present invention. Also, it is preferred that the chlorinated paraffins be odor-free or substantially odor-free. Examples of chlorinated paraffins are the Cereclor (I.C.I. America, Inc.) chlorinated paraffins Nos. 42, S.45, S.52, and 70, and the Chlorowax (Diamond Shamrock Chemical Company) chlorinated paraffins Nos. 40, 50 and 70. Still other chlorinated paraffins can be used. The chlorinated paraffin is used in an amount by weight sufficient to replace from about 5 to 80 percent by weight of the chlorine-containing polymeric resin on essentially a percent by weight chlorine (Cl) basis. For example, based on 100 parts by weight of polyol in a given formulation, if 20 parts by weight of polyvinyl chloride (about 57 percent by weight of chlorine - Cl) containing 11.40 parts of chlorine is reduced to 10 parts by weight of PVC in the formulation, a chlorinated paraffin containing 42 percent by weight of chlorine (Cl) should be added in an amount of about 13.7 parts by weight (to provide a total chlorine content of 11.45 parts by weight). Similar adjustments can be made with other chlorine-containing polymeric resins and other chlorinated paraffins.

The zinc oxide should be finely divided, for example, it should have an average particle size of from about 0.05 to 200 microns, preferably from about 0.15 to 50 microns. It should not contain any appreciable amount of impurities which would adversely affect the foaming reaction or the properties of the resulting foams. The zinc oxide may be American process zinc oxide, French process zinc oxide, or zinc oxides produced by other processes. Zinc oxide is a well known material and is shown by:
- A. "Encyclopedia Of Chemical Technology," Kirk and Othmer, The Interscience Encyclopedia, Inc., New York, Vol. 15, 1956, pages 262 266;
- B. "Zinc," Mathewson, Reinhold Publishing Corporation, New York, 1959, pages 346 to 385, and;
- C. "Compounding Ingredients For Rubber," Third Edition, 1961, Rubber World, New York, pages 65, 72, 77, 80, 81 and 88.

The chlorine-containing polymeric resin, zinc oxide and antimony trioxide are all employed in effective amounts to provide a flame retardant and/or self-extinguishing polyetherurethane foam. When part of the chlorine-containing polymeric resin is replaced with a given amount of the chlorinated paraffin, the amount of zinc oxide should be reduced by a proportionate amount essentially equivalent to the amount of the polymer eliminated. For example, where 5 percent by weight of the chlorine-containing polymeric resin is replaced with the chlorinated paraffin, then the amount of zinc oxide normally employed should be reduced by about 4 – 7 percent, usually 5 percent, by weight. Where the amount of the chlorine-containing polymeric resin is reduced by 50 percent by weight (and replaced with an essentially equivalent amount of the chlorinated paraffin on a chlorine basis), the amount of zinc oxide used should be reduced by about 50 percent by weight.

The antimony trioxide, also, should be finely divided, for example, it should have an average particle size of from about 0.05 to 200 microns, preferably from about 0.15 to 50 microns. It should not contain any deleterious materials which would adversely affect the foaming reaction or the properties of the resulting foam. The smaller particle sizes of antimony trioxide are most effective in the foam.

Polyols used in making the polyurethanes of the present invention are primary and secondary hydroxyterminated polyoxyalkylene ethers having from 2 to 4 hydroxyl groups and a molecular weight of from about 1,000 to 10,000. They are liquids or are capable or being liquified or melted for handling in the polyurethane foaming apparatus or machine.

Examples of polyoxyalkylene polyols include linear and branched polyethers having a plurality of ether linkages and containing at least two hydroxyl groups and being substantially free from functional groups other than hydroxyl groups. Among the polyoxyalkylene polyols which are useful in the practice of this invention are the polypropylene glycols, the polypropylene-ethylene glycols, and the polybutylene ether glycols. Polymers and copolymers of alkylene oxides are also adaptable in the process of this invention as well as the block copolymers of ethylene oxide and propylene oxide. Among the copolymers that deserve some special mention are the ethylene oxide, propylene oxide and butylene oxide adducts of ethylene glycol, propylene glycol, diethylene glycol, dipropylene glycol, triethylene glycol, 2-ethylhexanediol-1,3, glycerol, 1,2,6-hexanetriol, trimethylolpropane, trimethylolethane, pentaerythritol, triethanolamine, triisopropanolamine, ethylenediamine, and ethanolamine. Linear and branched copolyethers of other alkylene oxides are also useful in making the foamed products of this invention as well as the polypropylene diols, triols and tetrols end-blocked with ethylene oxide to provide primary hydroxyl groups in the polymer and having molecular weights of from about 2000 to 5000.

Examples of useful types of polyetherpolyols are characterized by reference to the following general formulae:

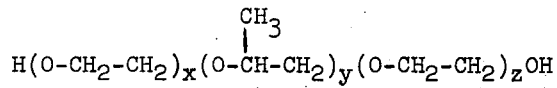

(A), and

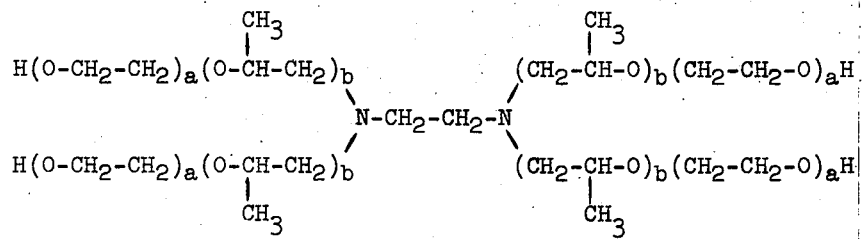

(B)

where in Formula A the total of subscripts, $x$, $y$, and $z$ represent positive integers in the range of from 20 to 70 and the total of subscripts a and b of Formula B represent positive integers in the range of from 20 to 100.

Branched polyethers have the advantage of making possible cross linking without the interaction of urea or urethane groups with the isocyanate groups. This has the advantage of making a larger proportion of the isocyanate used available for the evolution of carbon dioxide and the reducing of the overall amount of isocyanate that is required in the preparation of the foamed polymer. Mixtures of polyether polyols can be used.

Likewise, there can be used as polyols grafts of ethylenically unsaturated monomers such as acrylonitrile, methacrylonitrile, vinyl acetate, methyl acrylate and the like on the polyols and having the functionality and molecular weight as shown above. Such graft polyols and methods for making the same are shown in the U.S. Pats. to Stamberger, Nos. 3,304,273 and 3,383,351 and in the U.S. Pat. to Von Bonin, No. 3,294,711 where the monomer or monomers are polymerized with a free-radical or other catalyst in admixture with the polyol.

When desired, cross-linking materials having from 2 to 8 hydroxyl groups can be included in the foam formulation to increase cross link density and so forth. They have molecular weights of from about 60 to 600. Only small amounts of such materials are generally needed (about 0.3 to 10 mols per 100 mols of polyol). Examples of such crosslinking agents are glycol, diethylene glycol, propylene glycol, butane diol-1,4, dipropylene glycol, glycerol, trimethylolpropane, butane triols, hexanetriols, trimethylolphenol, various tetrols, such as erythritol and pentaerythritol, pentols, hexols, such as dipentaerythritol and sorbitol, as well as alkyl glucosides, carbohydrates, polyhydroxy fatty acid esters such as castor oil and polyoxy alkylated derivatives of poly-functional compounds having three or more reactive hydrogen atoms, such as, for example, the reaction product of trimethylolpropane, glycerol, 1,2,6-hexanetriol, sorbitol and other polyols with ethylene oxide, propylene oxide, or other alkylene epoxides or mixtures thereof, e.g., mixtures of ethylene and propylene oxides. Grafted crosslinkers can be prepared by the process of the aforementioned Stamberger and Von Bonin U.S. Patents. Mixtures of crosslinkers can be used. All of the polymer-forming ingredients should preferably be free of any amine function which is not sterically hindered or shielded.

Any organic di- or tri-isocyanate can be used in the practice of the present invention. Diisocyanates are preferred, particularly when there is any considerable amount of branching in the polyol or crosslinker to avoid the formation of rigid or semi-rigid foams. Examples of suitable organic polyisocyanates to use are ethylene diisocyanate, trimethylene diisocyanate, tetramethylene diisocyanate, pentamethylene diisocyanate, hexamethylene diisocyanate, propylene-1,2-diisocyanate, butylene-1,2-diisocyanate, butylene-1,3-diisocyanate, butylene-2,3-diisocyanate, alkylidene diisocyanates such as ethylidine diisocyanate and butylidine diisocyanate; cycloalkylene diisocyanates such as cyclopentylene-1,3-diisocyanate, cyclohexylene-1,2-diisocyanate, cyclohexylene-1,3-diisocyanate, and cyclohexylene-1,4-diisocyanate; cycloalkylidene diisocyanates such as cyclopentylidene diisocyanate and cyclohexylidene diisocyanate; aromatic diisocyanates such as m-phenylene diisocyanate, p-phenylene diisocyanate, polymethylene polyphenylisocyanate, 2,4-tolylene diisocyanate, 2,6-tolylene diisocyanate, bitolylene diisocyanate, naphthalene-1,4-diisocyanate, and diphenylene-4,4'-diisocyanate; aliphatic-aromatic diisocyanates such as xylylene-1,4-diisocyanate, xylyene 1,3-diisocyanate, bis(4-isocyanatophenyl)methane, bis (3-methyl-4-isocyanatophenyl) methane, and 4,4'-diphenylpropane diisocyanate, durylene diisocyanate, 4,4',4''-tris (isocyanatophenyl) methane, 3,1-0-diisocyanatotricyclo[5.2. 1.0$^{2,6}$] decane, bis-(2-isocyanatoethyl) carbonate, and naphthalene triisocyanate and the like. Mixtures of polyisocyanates can be used.

The polyisocyanate is used in an amount sufficient to react with the active hydrogen atoms (as determined by the Zerewitinoff method, J.A.C.S., Vol. 49, p. 3181 (1927)) in the polyols, crosslinkers, water, chlorine-containing polymeric resins (such as partially hydrolyzed vinyl chloride-vinyl acetate copolymers) and any other active hydrogen-containing material in the polyurethane foam formulation to provide the desired degree of crosslinking, chain extension, urea groups, blowing and so forth to obtain the desired flexibility, strength and other physical properties.

Water is used as a blowing agent and is employed in amounts of from about 1.0 to 5.5 parts by weight per 100 parts by weight of the polyol.

The water should be substantially or essentially pure, that is, it should be free of impurities such as ions, sols, etc. of mineral, vegetable or synthetic origin and the like which would adversely affect the foaming action or the properties of the resultant polyurethane foam. Deionized, distilled or otherwise purified water should be employed.

If lower density and softer foams are desired there additionally can be added to the polyurethane foam formulation separately or in admixture with one of the other components, i.e., polyol or polyisocyanate, etc., up to about 25 parts by weight of a fluorocarbon blowing agent per 100 parts by weight of the polyol. Examples of such blowing agents are those fluorine substituted aliphatic hydrocarbons which have boiling points between about $-40°C$ and $+170°C$, and which vaporize at or below the temperature of the foaming mass. The blowing agents include, for example, trichloromonofluoromethane, dichlorodifluoromethane, dichloromonofluoromethane, bromotrifluoromethane, chlorodifluoromethane, 1,1-dichloro-1-fluoroethane, 1,1-difluoro-1,2,2-trichloroethane, chloropentafluoroethane, 1-chloro-1-fluoroethane, 1-chloro-2-fluoroethane, 1,1,2-trichloro-1,2,2-trifluoroethane, 1,-1,1-trichloro-2,2,2-trifluoroethane, 2-chloro-nonafluoro-butane, hexafluorocyclobutene, and octafluorocyclobutane. Still other easily vaporizable fluorocarbons can be used. Mixtures of the fluorocarbons can be used. Still other blowing agents can be used in full or partial replacement of the fluorocarbons such as propane, butane, pentane, pentene, hexane and so forth, and mixtures thereof, particularly where precautions are taken to prevent explosions or where removal of the gasses is provided. See U.S. Pat. Nos. 3,072,582 and 3,391,093.

catalysts for the polyetherpolyol-polyisocyanate reaction can be any catalyst heretofore used in the art particularly the metal-containing catalysts. Examples of such catalysts are (1) tertiary phosphines such as trialkylphosphines, dialkyl-benzylphosphines, and the like; (2) strong bases such as the alkali and alkaline earth metal hydroxides, alkoxides, and phenoxides; (3) acidic metal salts of strong acids such as ferric chloride, stannic chloride, stannous chloride, antimony trichloride, bismuth nitrate, bismuth chloride, and the like; (4) chelates of various metals such as those which can be obtained from acetylacetone, benzoylacetone, trifluoroacetylacetone, ethyl acetoacetate, salicylaldehyde, cyclopentanone-2-carboxylate, and the like, with various metals such as Be, Mg, Zn, Cd, Pb, Ti, Zr, Sn, As, Bi, Cr, Mo, Mn, Fe, Co, Ni, or ions such as MoO₂++ and the like; (5) alcoholates and phenolates of various metals such as $Ti(OR)_4$, $Sn(OR)_4$, $Sn(OR)_2$, $Al(OR)_3$, and the like, wherein R is alkyl or aryl, and the reaction products of alcoholates with carboxylic acids, beta-diketones and 2(N,N-dialkylamino) alkanols, such as the well known chelates of titanium obtained by said or equivalent procedures; (6) salts of organic acids with metals such as alkali metals, alkaline earth metals, Al, Sn, Pb, Mn, Co, Bi, Sb, Ni, and Cu, including, for example, sodium acetate, potassium laurate, calcium hexanoate, stannous acetate, stannous octoate, stannous oleate, lead octoate, antimony trineodecanoate, antimony trioleate, bismuth trineodecanoate, metallic driers such as manganese, cobalt, lead naphthenate and the like; (7) organometallic derivatives of tetravalent tin, trivalent and pentavalent As, Sb, and Bi, and metal carbonyls of iron and cobalt; and (8) the dialkyltin salts of carboxylic acids, e.g., dibutyltin diacetate, dibutyltin dilaurate, dibutyltin maleate, dilauryltin diacetate, dioctyltin diacetate, dibutyltin-bis(4-methylaminobenzoate), dibutyltin-bis(6-methylaminocaproate), and the like; as well as a trialkyltin hydroxide, dialkyltin oxide, dialkyltin dialkoxide, or dialkyltin dichloride, such as trimethyltin hydroxide, tributyltin hydroxide, trioctyltin hydroxide, dibutyltin oxide, dioctyltin oxide, dilauryltin oxide, dibutyltin-bis(isopropoxide), dibutyltin-bis(2-methylaminopentylate), dibutyltin dichloride, dioctyltin dichloride, and the like and mixtures thereof, Preferred catalysts to use are the divalent tin salts of carboxylic acids having from 2 to 18 carbon atoms. These catalysts are used in an amount of from about 0.1 to 0.9 part by weight per 100 parts by weight of the polyether-polyol. It is less preferable to use these catalysts, such as the metal salts, alcoholates, hydroxides, alkoxides and phosphines, especially in large amounts, where resins containing ester groups in a substantial amount are used since they tend to hydrolyze the ester linkages thereby causing scission of the backbone polymer chain and lowering of the physical and chemical properties of the resultant foams and so forth, especially under conditions of high temperature and humidity.

Surfactants or emulsifiers are generally necessary to provide the desired cell formation and growth. Polysiloxane-polyoxyalkylene block copolymers are preferred. Polysiloxane-polyoxyalkylene block copolymers are described in U.S. Pats. 2,834,748 and 2,917,480. Another useful class of emulsifiers are the "non-hydrolyzable" polysiloxane-polyoxyalkylene block copolymers. This class of compounds differs from the above-mentioned polysiloxane-polyoxyalkylene block copolymers in that the polysiloxane moiety is bonded to the polyoxyalkylene moiety through direct carbon-to-silicon bonds, rather than through carbon-to-oxygen-to-silicon bonds. These copolymers generally contain from 5 to 95 weight percent, and preferably from 5 to 50 weight percent, of polysiloxane polymer with the remainder being polyoxyalkylene polymer. The copolymers can be prepared, for example, by heating a mixture of (a) a polysiloxane polymer containing a silicon-bonded, halogen-substituted monovalent hydrocarbon group and (b) an alkali metal salt of a polyoxyalkylene polymer to a temperature sufficient to cause the polysiloxane polymer and the salt to react to form the block copolymer. Still other polysiloxane-polyoxyalkylene copolymers known to the art may be employed as well as silicones, turkey red oil and so forth. The surfactant is used in an amount of from about 0.3 to 2.5 parts by weight per 100 parts by weight of the polyether polyol.

It is advantageous to incorporate into the urethane compositions of the present invention at least one organic tertiary amine catalyst, preferably together with a metal-containing co-catalyst. The amount of organic amine catalyst may comprise, per 100 parts by weight of organic polyol, about 0.05 to 3.2 parts by weight. In the case of the polyether polyols where metal catalyst is used for the urethane-forming reaction, it is preferred to use only from about 0.05 to 0.09 part by weight of the amine. On the other hand, where the tertiary amine is taking care of both the foaming ($H_2O+NCO$) and network ($-ROH+NCO$) reactions, the tertiary amines should be used in somewhat larger amounts within the specified ranges. However, since some polyols may differ in residual acid content (from neutralization of KOH catalyst (used to form polyol) with acid) due to incomplete washing, filtering or ionexchanging of the neutralized polyol and since antimony trioxide has some catalytic effect during the polyurethane foaming and forming reactions, the amount of tertiary amine may necessarily have to be reduced where large amounts of water are used as the primary blowing agent.

In the urethane compositions of the invention there may be used a wide variety of organic tertiary amine catalyst. Such organic amines, include, among others, tri-ethylene diamine, triphenyl amine, triethylamine N,N,N', N'-tetramethyl-1,3-butane diamine, N-methyl morpholine, N-ethyl morpholine, N-acetyl morpholine, N-octyl morpholine, N-coco morpholine, N-phenyl morpholine, N-hydroxyl ethyl morpholine, N-hydroxyl methyl morpholine, 4,4'-dithiodimorpholine, dimethyl piperazine, N,N,N'N'-tetramethyl propane diamine, trimethyl aminoethyl piperazine, N,N-dimethyl ethanolamine, dimethyl hexadecylamine, 1-(2-ethyl-1-hexenyl) piperazine, tri-n-octylamine, trimethylamine, N,N-dimethyl benzyl amine, triethanolamine, 1,2,4-trimethylpiperazine, N-methyl dicyclohexylamine, and mixtures thereof. The sterically hindered organic tertiary amines, especially those disclosed in Canadian Pat. No. 855,757 of Edwin M. Maxey and John T. Harrington, entitled "Urethane Foams Containing Halogen Containing Polymers And Methods For Preparing The Same Using Certain Catalysts," issued Nov. 10, 1970, also, can be employed in the foam formulations if desired.

Other well known constituents can be added to the polyurethane foam recipe such as barium and cadmium salts of carboxylic acids, clay, talc, $TiO_2$, silica and hydrated silica, $CaCO_3$, metal chromates, barytes, phthalocyanine green or blue pigments, red iron oxide, conventional stabilizers, carbon black, dyes, toners, extending oils, processing oils, epoxided soy bean oil (Paraplex G-62), epoxides (Epon 828), tricresyl phosphate, plasticizers, antioxidants, fungicides, bacteriostats, reodorants and the like. These constituents can be added in various amounts to the foaming ingredients to achieve the desired properties in the resultant flexible, low density foams.

The flexible, cellular urethane-vinyl chloride polymeric foams of the present invention can be used as cushions, mattresses, pillows, packing, cushioning material for furniture, automobiles, rug underlay, interior automobile and other vehicle door panels, seats, arm rests, head rests, and so forth.

The preparation of the polyurethane foams of the present invention can be formed by a process known in the art as the "one-shot" process or by a two step process involving, first, the preparation of a "prepolymer", the well known "semiprepolymer" or "quasi-prepolymer" technique. There all or a portion of the polyol is reacted with all of the organic polyisocyanate, providing a reaction product which contains a high percentage free isocyanate groups and which is reacted with the remaining portion of the hydroxyl-terminated polyol or a crosslinker, together with water, catalysts, the metal oxides, the chlorinecontaining polymeric resin and chlorinated paraffin to form a rubbery, cellular, elastic product.

No matter which particular technique is used, the chlorine-containing polymeric resin, zinc oxide, antimony trioxide and/or chlorinated paraffin may not only be dispersed with the polyol alone, but alternatively with the organic polyisocyanate alone. Still another method within the purview of the present invention involves dispersing these ingredients with a combination of the polyol and the organic polyisocyanate. In any case, it is advantageous to disperse these ingredients thoroughly into whatever particular initial composition is used.

The following examples will serve to illustrate the present invention with more particularly to those skilled in the art.

EXAMPLE I

Masterbatches were prepared by hand mixing together the polyether polyol, chlorine-containing polymeric resin and $Sb_2O_3$ with and without ZnO. The proportions of these materials are shown below:

After rising, the foams were placed in an oven and allowed to cure at about 250°F. for several minutes.

After curing and cooling, the resulting low density flexible foams were examined and appeared satisfactory physically. Samples were cut from the foams and were given a flammability test according to ASTM-D-1692-68. In this test a Bunsen burner flame having a blue cone of 1.5 inches in height is applied separately to the front edge of the foam test specimens (6 inches by 2 inches by 0.5 inch) and allowed to remain in contact therewith for a period of sixty seconds or until the one inch bench mark is reached. The "self-extinguishing time" is measured in seconds, and the "distance burned" is considered the furthermost point reached by the flame.

Flammability Test, ASTM-D-1692-68:

| Run No. | Self-Extinguishing Time, Seconds | Amount Of Burn | Comments |
|---|---|---|---|
| 1 | 35 | 1 5/8" | Melted and smothered |
| 2 | Non S.E. | All 5" | Formed black char |
| 3 | Non S.E. | All 5" | Formed black char |
| 4 | Non S.E. | All 5" | Dripped badly |
| 5 | 37 | 2 1/8" | Melted and smothered |
| 6 | Non S.E. | All 5" | |

The results of the above flammability tests showed that the foam of Run No. 1 containing effective amounts of PVC, ZnO and $Sb_2O_3$ was self-extinguishing. When ZnO was omitted as in the foam of Run No. 2, the foam burned. When the ZnO was

| INGREDIENT | PARTS BY WEIGHT | | | | | |
|---|---|---|---|---|---|---|
| | A | B | C | D | E | F |
| Poly G 3030 PG (1) | 100.0 | 100.0 | 100.0 | 100.0 | 100.0 | 100.0 |
| Geon 121 (2) | 15.0 | 15.0 | 10.0 | 7.5 | 7.5 | 7.5 |
| Antimony Trioxide (3) | 7.0 | 7.0 | 7.0 | 7.0 | 7.0 | 7.0 |
| ZnO (French Process) (4) | 2.7 | 0.0 | 0.0 | 2.7 | 1.35 | 0.0 |
| Total | 124.7 | 122.0 | 117.0 | 117.2 | 115.85 | 114.5 |

The masterbatches were then hand mixed with the other ingredients of the foam formulation generally in the order shown below, and the resulting mixture was then poured into a mold and permitted to foam:

omitted, the PVC reduced by a third, and chlorinated paraffin added on a weight basis (but not a chlorine weight percent basis) to replace the PVC, the foam still burned as shown by Run No. 3. In the foam of Run No.

| INGREDIENT | PARTS BY WEIGHT | | | | | |
|---|---|---|---|---|---|---|
| Run Nos.: | 1 | 2 | 3 | 4 | 5 | 6 |
| Masterbatch A | 124.7 | — | — | — | — | — |
| Masterbatch B | — | 122.0 | — | — | — | — |
| Masterbatch C | — | — | 117.0 | — | — | — |
| Masterbatch D | — | — | — | 117.2 | — | — |
| Masterbatch E | — | — | — | — | 115.85 | — |
| Masterbatch F | — | — | — | — | — | 114.5 |
| Cereclor 42 (5) | — | — | 5. | 7.5 | 7.5 | 7.5 |
| Deionized $H_2O$ | 4.0 | 4.0 | 4.0 | 4.0 | 4.0 | 4.0 |
| L-540 Silicone (6) | 1.0 | 1.0 | 1.0 | 1.0 | 1.0 | 1.0 |
| Methyl dicyclohexylamine | 0.1 | 0.1 | 0.1 | 0.1 | 0.1 | 0.1 |
| Antimony Trineodecanoate | 0.05 | 0.05 | 0.05 | 0.05 | 0.05 | 0.05 |
| T-9 (7) | 0.15 | 0.15 | 0.15 | 0.20 | 0.20 | 0.20 |
| TDI (8) | 50. | 50. | 50. | 50. | 50. | 50. |
| Chlorine (Cl) in the Polyvinyl chloride and/or chlorinated paraffin, total | 8.6 | 8.6 | 7.8 | 7.4 | 7.4 | 7.4 |
| Cream Time, Seconds | 18. | 19. | 19.5 | 19.5 | 19. | 20. |
| Rise Time, Seconds | 96. | 109. | 141. | 108. | 110. | 107. |
| Tack Free Time, Minutes | 4. | 4. | 4.5 | 4. | 4. | 4. |

4, the parts by weight of PVC were reduced by half and were replaced with an equal amount of chlorinated paraffin, but the foam burned. In the foam of Run No. 5, the amount of PVC was reduced by half and replaced by an equal amount of chlorinated paraffin and the amount of ZnO was reduced by half, providing a selfextinguishing foam almost as good as the foam of Run No. 1. The foam of Run No. 6 was the same as that of Run No. 5 except that all of the ZnO was omitted producing a non self-extinguishing foam. Notes:

1. Propylene oxide adduct of glycerol, secondary hydroxyl triol, 3000 m.w., approximate analysis: OH No. 56.3, Acid No. 0.038, $H_2O$ 0.018 percent, Olin Corporation.
2. Emulsion polymerized polyvinyl chloride resin, intrinsic viscosity of about 1.28, 100% through 200 mesh (less than about 74 microns), about 57 percent by weight of chlorine (Cl), The B. F. Goodrich Co.
3. Finely divided, average particle size of about 1.5 microns.
4. Finely divided, average particle size of about 1.0 micron.
5. Liquid chlorinated paraffin, approximate average molecular weight of about 530, contains about 42% by weight of chlorine, viscosity of about 25 poises at 25°C., I. C. I. America, Inc.
6. Polysiloxane-polyoxyalkylene block copolymer, surfactant, Union Carbide.
7. Stannous Octoate. In some machine foaming the stannous octoate is mixed with dioctylphthalate as a carrier in weight ratio of 1:2 to 1:4. The figures in the columns are for the stannous octoate per se.
8. 80/20 mixture of 2,4-/2,6-tolylene diisocyanates.

These results show that it is necessary to reduce the amount of zinc oxide but not to eliminate it when adding the chlorinated paraffin to the formulation as a replacement for part of the chlorine-containing polymeric resin. Also, when the antimony trioxide was omitted from the formulations of Runs Nos. 1 and 5 and the formulations foamed and tested for flame resistance, the foams burned the full 5 inches and were not self-extinguishing.

EXAMPLE II

Additional polyetherurethane foams were prepared generally according to the method of Example I, above, and then tested for their flame resistance. In these examples, the replacement of the chlorine-containing polymeric resin with a chlorinated paraffin was done on a chlorine percent by weight basis rather than a weight basis of the polymer or paraffin itself. The ingredients and amounts thereof used in making the hand mixed foams and the results on testing samples of the flexible, low density foams are shown below:

| INGREDIENT | PARTS BY WEIGHT | | | |
|---|---|---|---|---|
| Run Nos.: | 7 | 8 | 9 | 10 |
| Poly G-3030 PG* | 100.0 | 100.0 | 100.0 | 100.0 |
| Geon 121 * | 15.0 | 10.0 | 7.5 | — |
| Cerelor 42 * | — | 7.5 | 11.25 | — |
| Cereclor S.52 ** | — | — | — | 15 |
| $Sb_2O_3$ * | 7.0 | 7.0 | 7.0 | 7.0 |
| ZnO (French Process) * | 2.7 | 1.8 | 1.35 | 0.0 |
| $H_2O$, deionized | 4.0 | 4.0 | 4.0 | 4.0 |
| L-540 * | 1.0 | 1.0 | 1.0 | 1.0 |
| Methyl dicyclohexylamine | 0.1 | 0.1 | 0.1 | 0.1 |
| Antimony trineodecanoate | 0.05 | 0.05 | 0.05 | 0.05 |
| T-9 * | 0.1 | 0.1 | 0.1 | 0.1 |
| TDI * | 50.0 | 50.0 | 50.0 | 50.0 |
| Chlorine (Cl) in the polyvinyl chloride and/or chlorinated paraffin, total | 8.6 | 8.9 | 9.0 | 7.7 |
| Flammability ASTM-D-1692-68 | S.E. 35 Sec. | S.E. 28 Sec. | S.E. 37 Sec. | Burns All 5" |

\* The same as Example I, above.
\*\* Liquid chlorinated paraffin, approximate average molecular weight of about 400, about 51% by weight of chlorine, I.C.I. America, Inc.

These results show again the necessity for reducing the amount of zinc oxide when adding the chlorinated paraffin as a replacement for part of the chlorinecontaining polymeric resin. Also included are the results obtained using a chlorinated paraffin to replace 100 percent of the chlorine-containing polymeric resin.

EXAMPLE III

Additional polyetherurethane foams were prepared generally according to the method of Example I, above, on a large scale (machine mixes or machine runs) and then were tested according to ASTM-D-1692-68 for flammability. The ingredients used to make the foams and the test results on the resulting low density, flexible foams are shown below:

| INGREDIENT | PARTS BY WEIGHT | | | |
|---|---|---|---|---|
| Run Nos. | 11 | 12 | 13 | 14 |
| Poly G-3030 PG * | 100.0 | 100.0 | 100. | 100.0 |
| Geon 121 * | 15.0 | 7.5 | 7.5 | 10.0 |
| Antimony Trioxide * | 7.0 | 7.0 | 7.0 | 7.0 |
| ZnO (French Process)* | 2.7 | 1.35 | 1.35 | 0.7 |
| Cereclor 42 * | — | 7.5 | 11.25 | 7.50 |
| $H_2O$, deionized * | 4.0 | 4.0 | 4.0 | 4.0 |
| L-540 Silicone * | 1.0 | 1.0 | 1.0 | 1.0 |
| Methyl dicyclohexylamine | 0.1 | 0.1 | 0.1 | 0.1 |
| Antimony Trineodecanoate | 0.05 | 0.05 | 0.05 | 0.05 |
| T-9 * | 0.15 | 0.2 | 0.2 | 0.15 |
| TDI * | 50. | 50. | 50. | 50. |
| Chlorine (Cl) in the polyvinyl chloride and/or chlorinated paraffin, total | 8.6 | 7.4 | 9.0 | 8.9 |
| Cream Time, Seconds | 21 | 20.5 | 21 | 20 |
| Rise Time, Seconds | 111 | 106 | 108 | 105 |
| Tack Free Time, Minutes | 4 | 3.5 | 4 | 4 |

\* The same as Example I, above.

Flammability tests, ASTM-D-1692-68:

| Run No. | | Self-Extinguishing Time, Seconds | Amount of Burn | Comments |
|---|---|---|---|---|
| 11, | Sample I | 32 | 1″ | Melts and smothers |
|  | Sample II | 26 | 1″ | do. |
| 12 |  | erratic | usually all 5″ |  |
| 13, | Sample I | 32 | 1″ | Melts and smothers |
|  | Sample II | 29 | 1″ | do. |
| 14, | Sample I | 31 | 1¼″ | do. |
|  | Sample II | 30 | 1″ | do. |

Runs Nos. 11, 13 and 14 show the improved flame retardancy obtained when the chlorine-containing polymeric resin is replaced with a chlorinated paraffin on a chlorine basis rather than a weight basis.

EXAMPLE IV

Additional low density, flexible polyetherurethane foams were prepared generally according to the method of Example I, above, and then tested according to ASTM-D1692-68 for flammability. The ingredients used to make the foams and the results obtained are shown below:

| INGREDIENT | PARTS BY WEIGHT | |
|---|---|---|
| Run Nos. | 15 | 16 |
| Poly G-3030 PG * | 50.1 | 49.85 |
| Geon 121 * | 7.5 | 3.77 |
| Sb$_2$O$_3$ * | 3.5 | 3.46 |
| ZnO (French Process) * | 1.4 | .67 |
| Cereclor 42 * | — | 3.75 |
| H$_2$O, deionized | 2.0 | 2.0 |
| L-540 Silicone * | 0.5 | 0.5 |
| Methyl dicyclohexylamine | 0.05 | 0.05 |
| Antimony trineodecanoate | 0.03 | 0.03 |
| Freon 11 No. | 10.0 | 10.0 |
| T-9 * | 0.1 | 0.1 |
| TDI * | 25.0 | 25.0 |
| Chlorine (Cl) in the polyvinyl chloride and/or chlorinated paraffin, total | 4.3 | 3.7 |
| Cream Time, Seconds | 27 | 24.5 |
| Rise Time, Seconds | 200 | 153 |
| Tack Free Time, Minutes | 5 | 4.5 |

Notes:
* The same as Example I, above.
No. Trichlorofluoromethane, du Pont Co.
Foam of Run 15 as prepared was a little tight but wrung easily.
Foam of Run 16 as prepared exhibited very little tightness and wrung easily.

DRY HEAT AGED FOR 22 HOURS AT 284°F.

| Run No. | | Weight Before | Weight After | Comment |
|---|---|---|---|---|
| 15, | Sample I | 1.99 | 1.99 | Turned Pink |
|  | Sample II | 1.96 | 1.95 | do. |
| 16, | Sample I | 2.1 | 2.08 | Turned yellow |
|  | Sample II | 2.03 | 1.99 | do. |

Flammability test, ASTM-D-1692-68, before heat aging:

| Run No. | | Self-Extinguishing Time, Seconds | Amount of Burn | Comments |
|---|---|---|---|---|
| 15, | Sample I | 36 | 1⅞″ | Black smoke melts and smothers |
|  | Sample II | 41 | 2″ | do. |
| 16, | Sample I | 39 | 2½″ | Little dripping, melts and smothers |
|  | Sample II | 45 | 2⅝″ | do. |

Flammability test, ASTM-D-1692-68, after dry heat aging, 22 hours at 284°F.

| Run No. | | Self-Extinguishing Time, Seconds | Amount of Burn | Comments |
|---|---|---|---|---|
| 15, | Sample I | 40 | 2″ | Melts and smothers |
|  | Sample II | 46 | 2⅛″ | do. |
| 16, | Sample I | 34 | 1¾″ | Drips only at ignition, melts and smothers |
|  | Sample II | 36 | 1⅝″ | do. |

EXAMPLE V

More low density, flexible polyetherurethane foams were made (machine mixed) and tested for their flame retardant properties. The materials used to make the foams and the results of tests on the same are shown below:

TABLE I

| INGREDIENT | PARTS BY WEIGHT | | |
|---|---|---|---|
| Run Nos. | 17 | 18 | 19 |
| Poly G-3030 PG * | 100.0 | 100.0 | 100.0 |
| PVC * | 15.0 | 10.0 | 7.5 |
| Cereclor 42 * | — | 7.5 | 11.25 |
| Sb$_2$O$_3$ * | 7.0 | 7.0 | 7.0 |
| ZnO * | 2.8 | 1.9 | 1.4 |
| H$_2$O * | 4.0 | 4.0 | 4.0 |
| L-540 Silicone * | 1.0 | 1.0 | 1.0 |
| Methyl dicyclohexylamine | 0.1 | 0.1 | 0.1 |
| T-9 * | 0.3 | 0.3 | 0.3 |
| TDI * | 50.0 | 50.0 | 50.0 |
| Physical Properties | | | |
| Tensile (psi) (pounds/sq. inch) | 13.5 | 14.3 | 16.7 |
| Elongation (%) | 126 | 153 | 180 |
| Tear (pli) (pounds linear inch) | 1.85 | 2.05 | 1.85 |
| Flammability | | | |
| Vertical Burn test (60 sec. ignition) | Pass, 13 sec. flame out, 4.2″ burn length | Pass, 15 sec. flame out, 4.4″ burn length | Pass, 15 sec. flame out, 4.6″ burn length |
| ASTM-D-1692-68 Initial | S.E. 28 seconds | S.E. 31 seconds | S.E. 30 seconds |
| After Dry Heat Aging (22 hrs. at 284°F) | S.E. 20 seconds | S.E. 20 seconds | S.E. 23 seconds |
| Weight Loss (% by weight) | | | |
| After Dry Heat Aging (22 hrs. at 284°F) | 0.4 | 1.2 | 2.00 |

* The same as Example I, above.

TABLE II

| INGREDIENT | PARTS BY WEIGHT | | |
|---|---|---|---|
| Run Nos. | 20 | 21 | 22 |
| Poly G-3030 PG * | 100.0 | 100.0 | 100.0 |
| PVC * | 7.0 | 4.6 | 3.5 |
| Cereclor 42 * | — | 3.6 | 5.25 |
| $Sb_2O_3$ * | 3.25 | 3.25 | 3.25 |
| ZnO * | 1.25 | 0.82 | 0.62 |
| $H_2O$ * | 4.0 | 4.0 | 4.0 |
| L-540 Silicone * | 1.0 | 1.0 | 1.0 |
| Methyl dicyclohexylamine | 0.1 | 0.1 | 0.1 |
| T-9 * | 0.3 | 0.3 | 0.3 |
| TDI * | 50.0 | 50.0 | 50.0 |
| Physical Properties | | | |
| Tensile (psi) | 15.3 | 15.7 | 16.7 |
| Elongation (%) | 185 | 196 | 203 |
| Tear (pli) | 2.05 | 2.05 | 2.25 |
| Flammability | | | |
| MVSS 302 (9) | S.E./NBR | S.E./NBR | S.E./NBR |
| Initial | (10) | (10) | (10) |
| After Dry Heat Aging | S.E./NBR | S.E./NBR | S.E./NBR |
| (22 hrs. at 284°F) | (10) | (10) | (10) |
| Weight Loss | | | |
| (% by weight) | | | |
| After Dry Heat Aging | | | |
| (22 hrs. at 284°F) | 0.4 | 0.4 | 0.7 |

(9) U.S. Gov't. Motor Vehicle Safety Standard
(10) Self extinguishing, no burn rate, passed.
* The same as Example I, above.

EXAMPLE VI

Additional low density, flexible polyetherurethane foams were prepared generally according to the method of Example I, above, and, except that they did not contain any chlorine-containing polymeric resin, then were tested according to ASTM-D-1692-68 for flammability. The ingredients used to make the hand mixed foams and the results obtained are shown below:

| INGREDIENT | PARTS BY WEIGHT | | | | | |
|---|---|---|---|---|---|---|
| Run Nos. | 23 | 24 | 25 | 26 | 27 | 28 |
| Poly G-3030 PG * | 100.0 | 100.0 | 100.0 | 100.0 | 100.0 | 100.0 |
| Anitmony trioxide * | 7.0 | 7.0 | 7.0 | 7.0 | 7.0 | 7.0 |
| Zinc oxide (French Process)* | — | — | — | 3 | 3 | 3 |
| Deionized water * | 4 | 4 | 4 | 4 | 4 | 4 |
| Cereclor 42 * | 5 | 10 | 15 | 5 | 10 | 15 |
| L-540 Silicone * | 1 | 1 | 1 | 1 | 1 | 1 |
| Dabco 33 LV *** | 0.24 | 0.24 | 0.24 | 0.24 | 0.24 | 0.24 |
| T-9 * | 0.3 | 0.3 | 0.3 | 0.3 | 0.3 | 0.3 |
| TDI * | 50 | 50 | 50 | 50 | 50 | 50 |
| Chlorine (Cl) in chlorinated paraffin, total | 2.1 | 4.2 | 6.3 | 2.1 | 4.2 | 6.3 |
| Cream Time, Seconds | 17 | 19 | 22 | 23 | 25 | 28 |
| Rise Time, Seconds | 88 | 97 | 106 | 107 | 120 | 131 |
| Tack Free Time, Minutes | 3 | 3 | 3 | 3.5 | 3.5 | 4 |

* The same as Example I, above.
*** Solution of 33% by weight of triethylene diamine in dipropylene glycol, Dabco 33 LV, Houdry Process Corp.

All six foams had health blips and no tightness and were good foams.

Flammability tests, ASTM-D-1692-68 (modified as to Example I-measurement made only after first inch had burned)

| Run No. | | Self-Extinguishing Time, Seconds | Amount of Burn | Comments |
|---|---|---|---|---|
| 23, | Sample I | Non S.E. | All 4" | Melted and dripped |
|  | Sample II | do. | do. | do. |
| 24, | Sample I | do. | do. | do. |
|  | Sample II | do. | do. | do. |
| 25, | Sample I | 83 | 2" | do. |
|  | Sample II | Non S.E. | All 4" | do. |
| 26, | Sample I | do. | do. | do. |
|  | Sample II | do. | do. | do. |
| 27, | Sample I | do. | do. | do. |
|  | Sample II | do. | do. | do. |
| 28, | Sample I | do. | do. | do. |
|  | Sample II | do. | do. | do. |

The results of Example VI show that complete substitution of the polyvinyl chloride by the chlorinated paraffin does not provide the desired flame retardancy.

The foregoing data show that satisfactory foams can be obtained in which part, of but not all of, the chlorine-containing polymeric resin is replaced with a chlorinated paraffin and with a reduction in the amount of the zinc oxide employed. This provides a quality foam at an economical material cost since both the chlorine-containing polymeric resin and zinc oxide are more expensive than the chlorinated paraffin.

The embodiments of the invention in which an exclusive property or privilege is claimed are defined as follows:

1. A low density, flexible or semiflexible fire retardant polyetherurethane foam, the ether moieties of said foam being derived from polyether polyols having a molecular weight of from about 1,000 to 10,000 and having from 2 to 4 hydroxyl groups containing, based on 100 parts by weight of said polyol, (I) from about 1 to 50 parts by weight of a finely divided, solid chlorine containing polymeric resin having an intrinsic viscosity of from about 0.25 to 2.5 (II) finely divided zinc oxide in an amount of from about 0.1 to 10 parts by weight, (III) finely divided antimony trioxide in an amount of from about 0.5 to 15 parts by weight, and (IV) a chlorinated paraffin having an average molecular weight of from about 250 to 1400 and containing from about 40 to 70 percent by weight of chlorine, wherein said chlorinated paraffin is used in an amount by weight sufficient to replace from about 5 to 80 percent by weight of said chlorine-containing polymeric resin on essentially a percent by weight chlorine (Cl) basis, and wherein the percent by weight of said zinc oxide is essentially proportionally reduced in accordance with the reduction in the percent by weight of said chlorine-containing polymeric resin.

2. A foam according to claim 1 in which the polyol is a polyalkylene ether polyol.

3. A foam according to claim 2 in which the resin (I) is selected from the group consisting of polyvinyl chloride, a copolymer of a major amount of vinyl chloride and a minor amount of vinyl acetate, a partially hydrolyzed copolymer of a major amount of vinyl chloride and a minor amount of vinyl acetate, and chlorinated polyethylene and in which said resin is present in an amount of from about 2 to 25 parts by weight, the zinc oxide (II) is present in an amount of from about 0.2 to 5 parts by weight, and the antimony trioxide (III) is used in an amount of from about 1 to 10 parts by weight, the amounts of said (I), (II) and (III) being based on 100 parts by weight of said polyol.

4. A foam according to claim 3 in which the resin (I) is polyvinyl chloride prepared by an emulsion polymerization process.

5. A foam according to claim 4 in which the metal-containing catalyst is stannous octoate.

6. A foam according to claim 1 in which said chlorinated paraffin (IV) is a liquid at room temperature.

* * * * *